United States Patent
Peng et al.

(10) Patent No.: US 9,686,687 B2
(45) Date of Patent: Jun. 20, 2017

(54) METHOD AND SYSTEM FOR MONITORING AND PROCESSING WIRELESS SIGNALS

(71) Applicant: Institute of Sensing Technology and Business, Beijing University of Posts and Telecommunications, Wuxi (CN)

(72) Inventors: Mugen Peng, Beijing (CN); Zhongyuan Zhao, Beijing (CN); Chao Huang, Beijing (CN); Jingyun Chang, Beijing (CN)

(73) Assignee: Institute of Sensing Technology and Business, Beijing University of Posts and Telecommunication, Wuxi (CN)

( * ) Notice: Subject to any disclaimer, the term of this patent is extended or adjusted under 35 U.S.C. 154(b) by 0 days.

(21) Appl. No.: 14/845,372

(22) Filed: Sep. 4, 2015

(65) Prior Publication Data
US 2016/0269902 A1 Sep. 15, 2016

(30) Foreign Application Priority Data
Mar. 11, 2015 (CN) .......................... 2015 1 0106141

(51) Int. Cl.
*H04W 12/08* (2009.01)
*H04W 12/12* (2009.01)
*H04L 29/06* (2006.01)

(52) U.S. Cl.
CPC .......... *H04W 12/08* (2013.01); *H04W 12/12* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 2004/0107219 A1* | 6/2004 | Rosenberger | H04L 12/2602 |
| 2007/0180244 A1* | 8/2007 | Halasz | H04L 63/0869 |
| | | | 713/168 |
| 2015/0163734 A1* | 6/2015 | Park | H04W 12/12 |
| | | | 370/338 |

OTHER PUBLICATIONS

GSMK CryptoPhone 500 Quick Start Guide by GSMK Cryptophone, dated 2013.*

* cited by examiner

*Primary Examiner* — Daniel Lai
(74) *Attorney, Agent, or Firm* — Harness & Dickey & Pierce, P.L.C.

(57) ABSTRACT

A method and system for monitoring and processing a wireless signal are described. The method includes, if an authorized base station/Access Point (AP) receives a first abnormal signal from the terminal, which is identified as an unauthorized signal by a terminal, processing, by the authorized base station/AP, the first abnormal signal. If the authorized base station/Access Point (AP) receives a second abnormal signal from the terminal and the terminal cannot determine whether the second abnormal signal is the unauthorized signal or an authorized signal, identifying, by the authorized base station/AP, characteristics of the second signal and processing the second abnormal signal if the second abnormal signal is the unauthorized signal.

14 Claims, 8 Drawing Sheets

METHOD AND SYSTEM FOR MONITORING AND PROCESSING WIRELESS SIGNALS

CROSS-REFERENCE TO RELATED APPLICATIONS

This application claims the benefit and priority of Chinese Application No. 201510106141.6 filed Mar. 11, 2015. The entire disclosure of the above application is incorporated herein by reference.

FIELD

The present disclosure relates to a field of wireless communication and computer technologies and to methods and a system for monitoring and processing wireless signals in real time.

BACKGROUND

This section provides background information related to the present disclosure which is not necessarily prior art.

Presently, with the continuous development of wireless communication technologies and a rapid increase of requirements on wireless services, the wireless spectrum is shared by a variety of different types of wireless devices and wireless mobile services. Some wireless devices may perform unauthorized operations, which may interfere with other authorized devices and even cause various security issues. Therefore, it is important to scientifically supervise and manage the wireless signals. The unauthorized wireless signal sent out by a pseudo-base station/unauthorized Access Point (AP) may be identified by monitoring the wireless signal. It is necessary to reduce unfriendly wireless communication, which has great social and economic interests.

With the rapid development of mobile technology, storage capacity, communication capability, sensory ability, and Operating System (OS) technology, etc., the wireless terminal represented by the smartphone has improved and the wireless terminal has become an important information processing tool. Although the performance of the wireless terminal is improving, it is presently a significant challenge to solely rely on the wireless terminal to monitor and analyze the wireless signals, which are complicated, carry a huge amount of information, and make decisions. Complicated computing functions may be performed via a cloud computing platform to relieve technical bottlenecks of the processing of the wireless signal and realize an advance and technical improvement of the wireless communication technologies.

SUMMARY

This section provides a general summary of the disclosure, and is not a comprehensive disclosure of its full scope or all of its features.

In view of the above, various embodiments provide methods and a system for monitoring and processing wireless signals to enhance the efficiency of monitoring and processing the wireless signals.

Various embodiments provide a method for monitoring and processing a wireless signal, including the following:

detecting, by a terminal, a first abnormal signal, identifying, by the terminal, if a signal is an unauthorized signal or an authorized base station/Access Point (AP) of processing the first abnormal signal and reporting. If the terminal cannot determine whether the first abnormal signal is the unauthorized signal or an authorized signal, the characteristics of the first abnormal signal are sent to the authorized base station/AP;

identifying, by the authorized base station/AP, the characteristics of the first abnormal signal reported by the terminal if the terminal cannot determine whether the first abnormal signal is the unauthorized signal or the authorized signal, processing, by the authorized base station/AP, the first abnormal signal if the first abnormal signal is the unauthorized signal and reporting the characteristics of the first abnormal signal to a centralized cloud server if the authorized base station/AP cannot determine whether the first abnormal signal is the unauthorized signal or authorized signal;

identifying, by the centralized cloud server, the characteristics of the first abnormal signal if the terminal and the authorized base station/AP are not sure whether the first abnormal signal is the unauthorized signal or authorized signal and notifying the authorized base station/AP of processing the first abnormal signal if the first abnormal signal is the unauthorized signal.

Various embodiments provide a system for monitoring and processing a wireless signal, including:

a terminal, to detect a first abnormal signal, identify characteristics of the first abnormal signal, notify, if the first abnormal signal is an unauthorized signal, an authorized base station/Access Point (AP) of processing the first abnormal signal and report. If the terminal cannot determine whether the first abnormal signal is the unauthorized signal or an authorized signal, the characteristics of the first abnormal signal are sent to the authorized base station/AP;

the authorized base station/AP, to identify the characteristics of the first abnormal signal reported by the terminal if the terminal cannot determine whether the first abnormal signal is the unauthorized signal or the authorized signal, process the first abnormal signal if the first abnormal signal is the unauthorized signal and report the characteristics of the first abnormal signal to a centralized cloud server if the authorized base station/AP is not sure whether the first abnormal signal is the unauthorized signal or the authorized signal; and the centralized cloud server, to identify the first abnormal signal if the authorized base station/AP cannot determine whether the second abnormal signal is the unauthorized signal or the authorized signal and notify the authorized base station/AP of processing the first abnormal signal if the first abnormal signal is the unauthorized signal.

Various embodiments provide a method for monitoring and processing a wireless signal, including:

if an authorized base station/Access Point (AP) receives a first abnormal signal from the terminal, which is identified as an unauthorized signal by a terminal, processing, by the authorized base station/AP, the first abnormal signal;

if the authorized base station/Access Point (AP) receives a second abnormal signal from the terminal and the terminal cannot determine whether the second abnormal signal is the unauthorized signal or an authorized signal, identifying, by the authorized base station/AP, characteristics of the second signal and processing the second abnormal signal if the second abnormal signal is the unauthorized signal.

Various embodiments utilize the data processing capability of the professional-testing processing terminal. The professional-testing processing terminal detects the abnormal signal and identifies the characteristics of the abnormal signal at the first level. If the professional-testing processing terminal determines that the abnormal signal is the unauthorized signal, the professional-testing processing terminal notifies the authorized base station/AP of processing the abnormal signal. If the professional-testing processing terminal cannot determine whether the abnormal signal is the unauthorized signal or authorized signal, the professional-testing processing terminal reports the abnormal signal to the authorized base station/AP. The authorized base station/AP identifies the characteristics of the abnormal signal reported by the professional-testing processing terminal at the second level. If the authorized base station/AP identifies that the abnormal signal is the unauthorized signal, the authorized base station/AP processes the abnormal signal. If the authorized base station/AP is not sure whether the abnormal signal is the authorized signal or unauthorized signal, the authorized base station/AP reports the abnormal signal to the centralized cloud server. The centralized cloud server identifies the characteristics of the abnormal signal at a higher level. If the centralized cloud server identifies that the abnormal signal is the unauthorized signal, the centralized cloud server notifies the authorized base station/AP of processing the abnormal signal. With the level-by-level computing, identification and processing in various embodiments, the distributed computing of the terminal may be utilized to effectively reduce the amount of data processed by the cloud computing platform, reduce the communication pressure between the terminal and the cloud computing platform, reduce the occurring rate of the communication bottleneck and the data processing bottleneck, and enhance the efficiency for monitoring and processing the wireless signal.

Various embodiments provide method flows for monitoring, identifying, storing, and analyzing the wireless signal and making decisions in real time and through edge cloud computing platform system architecture, which is compatible with the method flow. The methods may effectively identify and screen the unauthorized signals of the pseudo-base station/unauthorized AP and manage spectrum resources. Further, processes of the method are clear and convenient for implementation and have a promising prospect of application.

Further areas of applicability will become apparent from the description provided herein. The description and examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is further described in detail hereinafter with reference to the accompanying drawings.

The current cloud computing platform adopts the centralized architecture and is configured with extensive amounts of computing resources and super computing power, has the capability of storing extensive amounts of data and the capability of computing and processing the data at high speed, and processes data efficiently. However, since all computing and processing functions are performed by the cloud computing platform, the stress on the communication between the terminal and the cloud computing platform is increased. In order to avoid the communication processing bottleneck and improve the monitoring and processing efficiency of the wireless signals, various embodiments of the present disclosure provide a scheme for processing the extensive wireless signals.

Figure 1:
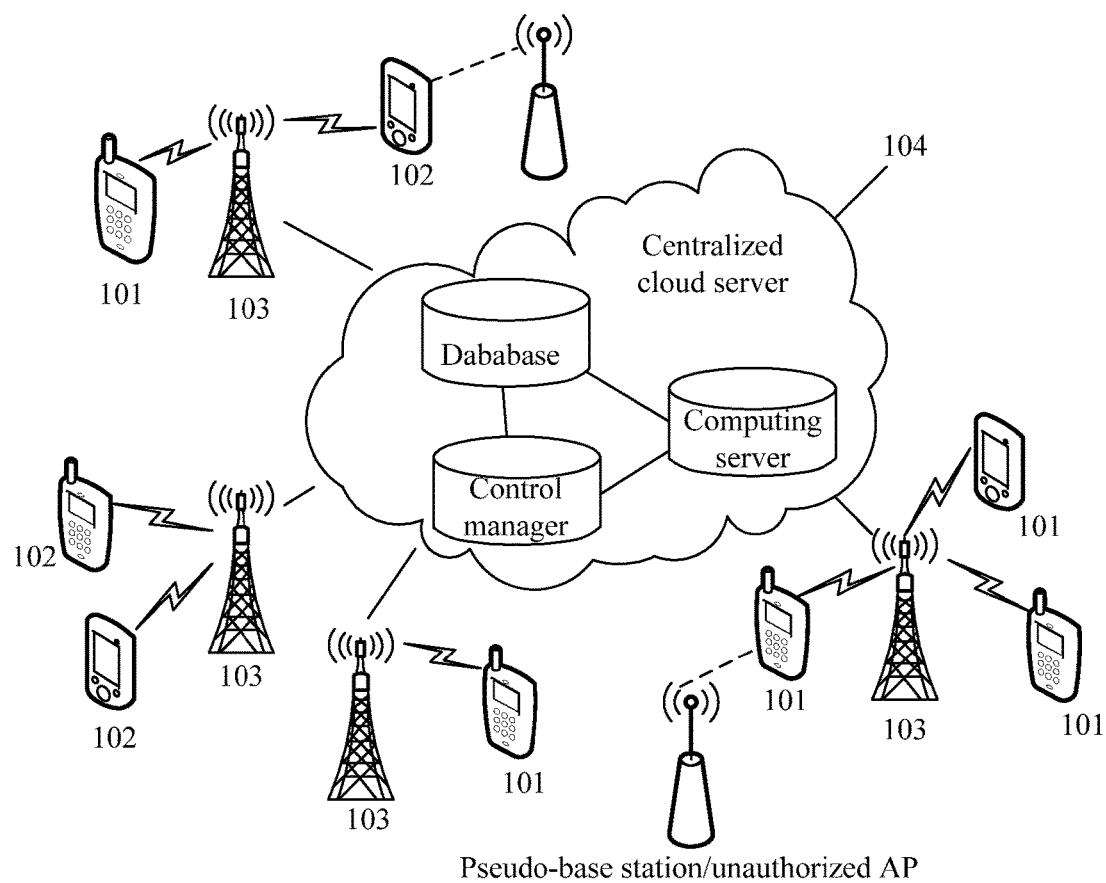
FIG. 1 is a diagram illustrating a system for monitoring and processing wireless signals according to various embodiments.

FIG. 1 is a diagram illustrating the structure of a system for monitoring and processing wireless signals according to various embodiments of the present disclosure. The system for monitoring and processing the wireless signals includes a junior-testing processing terminal 101, a professional-testing processing terminal 102, an authorized base station/AP 103, and a centralized cloud server 104. Due to the special structure adopted by the present disclosure, a cloud computing platform system used for implementing the method for monitoring and processing the wireless signals is also called an edge cloud computing platform system.

The junior-testing processing terminal 101 is a mobile communication terminal with a preliminary computing and processing capability, such as a smartphone, and detects an abnormal signal in its detection scope. For instance, the junior-testing processing terminal 101 periodically detects the abnormal signal in its detection scope. The junior-testing processing terminal 101 further reports characteristics of the abnormal signal to the authorized base station/AP 103.

The professional-testing processing terminal 102 is a dedicated computing processing and testing terminal, has more professional testing and processing capability than that of the junior-testing processing terminal, and detects an abnormal signal in its detection scope. For instance, the professional-testing processing terminal 102 periodically detects the abnormal signal in its detection scope. The professional-testing processing terminal 102 further identifies characteristics of the detected abnormal signal, notifies the authorized base station/AP 103 of process the abnormal signal if the detected abnormal signal is the unauthorized signal, and reports characteristics of the normal signal to the authorized base station/AP 103 if the professional-testing processing terminal 102 is not sure whether the abnormal signal is the unauthorized signal or an authorized signal.

The authorized base station/AP 103 is an authorized base station/AP with the professional computing processing capability and identifies the characteristics of the abnormal signals reported by the junior-testing processing terminal and professional-testing processing terminal 102, processes an unauthorized signal if the unauthorized signal is identified from the abnormal signals, and reports characteristics of the abnormal signals to the centralized cloud server if the authorized base station/AP 103 is not sure whether the abnormal signals are authorized signals or unauthorized signals.

The centralized cloud server 104 is a centralized cloud service computing and processing server and identifies the characteristics of the abnormal signals reported by the authorized base station/AP 103 and notifies the authorized base station/AP 103 of processing an unauthorized signal if the unauthorized signal is identified from the abnormal signals reported by the authorized base station/AP 103.

According to various embodiments of the present disclosure, the system may omit the junior-testing processing terminal 101. The legal base station/AP 103 identifies the characteristics of the abnormal signal reported by the professional-testing processing terminal 102.

According to various embodiments, the centralized cloud server 104 further stores the characteristics of the identified signals in its local signal characteristic database. According to various embodiments, the identified signals are the abnormal signal reported by the junior-testing processing terminal 101 and the abnormal signal reported by the professional-testing processing terminal 102. The authorized base station/AP 103 and centralized cloud server 104 are further used to exchange characteristics of different signals, i.e. the abnormal signal reported by the junior-testing processing terminal 101 and the abnormal signal reported by the professional-testing processing terminal 102 according to various embodiments via a feedback link between the authorized base station/AP 103 and the centralized cloud server 104 and update their local signal characteristic databases according to characteristics of the exchanged signals. The professional-testing processing terminal 102 and authorized base station/AP 103 are further used to exchange characteristics of different signals via a feedback link between the professional-testing processing terminal 102 and authorized base station/AP 103 and update their local signal characteristic databases according to characteristics of the exchanged signal.

The junior-testing processing terminal 101 periodically detects signals in an environment, at which the junior-testing processing terminal 101 is located to determine whether there is an abnormal signal, extracts characteristics of the abnormal signal, reduces the dimensionality of the characteristics of the extracted abnormal signal, and reports the characteristics of the abnormal signal and frequency of the abnormal signal used by the abnormal signal to the authorized base station/AP 103. The junior-testing processing terminal 101 is constituted by the following:

a detection module, to perform signal detection for received data to determine whether the data includes an abnormal signal;

an extraction module, to extract characteristics of the abnormal signal and extract characteristics of a frequency used by the abnormal signal;

a dimension reduction module, to screen characteristics of the abnormal signal and reduce dimensionality of the characteristics of the abnormal signal; and a reporting module, to initiatively report the characteristics of the abnormal signal and frequency used by the abnormal signal to the authorized base station/AP 103 via a feedback link between the junior-testing processing terminal 101 and the authorized base station/AP 103.

According to various embodiments of the present disclosure, the detection module may detect multiple abnormal signals. In this situation, the extraction module, dimension reduction module, and reporting module process the multiple abnormal signals with the above methods.

Compared with the junior-testing processing terminal 101, the professional-testing processing terminal 102 has the capability of identifying the unauthorized signal, periodically performs signal detection in the environment, at which the professional-testing processing terminal 102 is located, to determine whether there is an abnormal signal, extracts the characteristics of the abnormal signal, reduces the dimensionality of the characteristics of the abnormal signal and identifies whether the abnormal signal is the unauthorized signal according to a local signal characteristic database. If the abnormal signal is the unauthorized signal, the professional-testing processing terminal 102 initiatively reports a warning signal to the authorized base station/AP 103. The warning signal includes characteristics of a frequency used by the unauthorized signal. The warning signal requires the authorized base station/AP 103 to add transmit power to the frequency used by the unauthorized signal. If the abnormal signal is not the unauthorized signal, the professional-testing processing terminal 102 reports the characteristics of the abnormal signal and the characteristics of the frequency used by the abnormal signal to the authorized base station/AP 103.

The professional-testing processing terminal 102 includes the following modules. A detection module performs signal detection for received data to determine whether the data includes an abnormal signal. An extraction module extracts characteristics of the abnormal signal and extracts characteristics of a frequency used by the abnormal signal. A dimension reduction module screens characteristics of the extracted abnormal signal and reduces dimensionality of the characteristics. An identification module identifies whether the abnormal signal is an unauthorized signal according to a local signal characteristic database, trigger a reporting module to report a warning single to the authorized base station/AP 103 if the abnormal signal is the unauthorized signal, and trigger the reporting module to report characteristics of the abnormal signal and characteristic of the frequency used by the abnormal signal to the authorized base station/AP 103 if the abnormal signal is not the unauthorized signal. According to various embodiments, the local signal characteristic database may be a local unauthorized signal characteristic database. The reporting module initiatively reports a warning signal to the authorized base station/AP 103 or reports the characteristics of the abnormal signal and the frequency used by the abnormal signal to the authorized base station/AP 103 via a feedback link between the professional-testing processing terminal 102 and the authorized base station/AP 103.

The authorized base station/AP 103 receives the warning signal reported by the professional-testing processing terminal 102 and receives the characteristics of the abnormal signals reported by the junior-testing processing terminal 101 and/or professional-testing processing terminal 102 and the characteristics of the frequency used by the abnormal signals, identifies the types of the abnormal signals according to the local signal characteristic database, adds the transmitting power to a frequency used by an unauthorized signal to shield the unauthorized signal of the pseudo base-station/unauthorized AP if the unauthorized signal is identified from the abnormal signal, stop any processing if the abnormal signals are the authorized signals, and initiatively reports the characteristics of the abnormal signals and the characteristics of the frequencies used by the abnormal signals to the centralized cloud server 104 if the authorized base station/AP is not sure whether the abnormal signals are authorized signals or unauthorized signals. The types of the abnormal signals may include the unauthorized signal, authorized signal, and the abnormal signal, which cannot be identified as the authorized signal or unauthorized signal.

According to various embodiments of the present disclosure, the detection module may detect multiple abnormal signals. In this situation, the extraction module, dimension reduction module, identification module, and reporting module process the multiple abnormal signals with the above methods.

The authorized base station/AP 103 includes the following modules. A receiving module receives characteristics of an abnormal signal and characteristics of a frequency used by the abnormal signal reported by the junior-testing processing terminal 101 or professional-testing processing terminal 102 and a warning signal reported by the professional-testing processing terminal 102. An identification module identifies the type of the abnormal signal according to a local signal characteristic database. An adjustment module adds a transmitting power to the frequency used by the abnormal signal according to the warning signal received by the receiving module or an identification result obtained by the identification module. A reporting module initiatively reports the characteristics of abnormal signals and characteristics of the frequencies used by the abnormal signals, which cannot be identified by the authorized base station/AP 103 to a centralized cloud server 104 via a feedback link between the authorized base station/AP 103 and the centralized cloud server 104.

The centralized cloud server 104 receives the characteristics of the abnormal signals and characteristics of the frequencies used by the abnormal signals reported by the authorized base station/AP 103, makes decisions based on the received information, identifies the types of the abnormal signals, returns the result of the identification to the authorized base station/AP 103, and periodically broadcasts the characteristics of abnormal signals and signal types, which are newly added at local, to the authorized base station/AP 103 and professional-testing processing terminal 102.

The centralized cloud server 104 includes the following modules. A receiving module receives characteristics of abnormal signals and characteristics of frequencies used by the abnormal signals reported by the authorized base station/AP 103. A computing server makes decisions on the received abnormal signals and identifies the types of the abnormal signals. A control manager returns a result of the identification performed by the centralized cloud server 104 to the authorized base station/AP 103 and periodically broadcasts the characteristics of abnormal signals and signal types, which are newly added at local, to the authorized base station/AP 103 and professional-testing processing terminal 102. A database module stores the result of the identification performed by the centralized cloud server 104, i.e. the characteristics of the abnormal signals and the signal types to a database.

The feedback link between either of the junior-testing processing terminal 101 and the professional-testing processing terminal 102 and the authorized base station/AP 103 is a wireless link. The feedback link between the authorized base station/AP 103 and the centralized cloud server 104 is the wired link, such as a fiber or cable, or is the wireless link.

Figure 2:
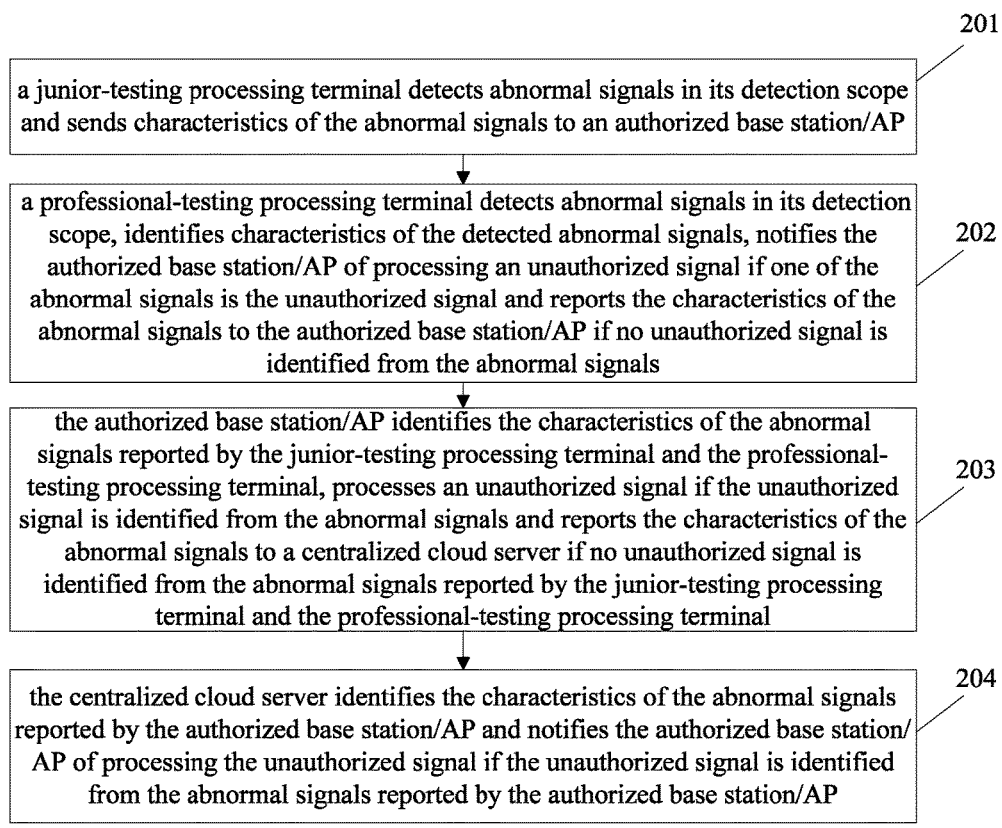
FIG. 2 is a flow chart of a method for monitoring and processing wireless signals in real time according to various embodiments.

Accordingly, various embodiments of the present disclosure further disclose a method for monitoring and processing a wireless signal in real time, which is executed by the above system for monitoring and processing the wireless signal in real time. FIG. 2 is a flow chart of a method for monitoring and processing a wireless signal in real time in accordance with various embodiments of the present disclosure. In reference to the embodiment shown in FIG. 2, the method includes the following blocks.

Block 201: A junior-testing processing terminal detects abnormal signals in its detection scope and sends characteristics of the abnormal signals to an authorized base station/AP.

Block 202: A professional-testing processing terminal detects abnormal signals in its detection scope, identifies characteristics of the detected abnormal signals, notifies the authorized base station/AP of processing an unauthorized signal if one of the abnormal signals is the unauthorized signal, and reports the characteristics of the abnormal signals to the authorized base station/AP if no unauthorized signal is identified from the abnormal signals.

Block 203: The authorized base station/AP identifies the characteristics of the abnormal signals reported by the junior-testing processing terminal and the professional-testing processing terminal, processes an unauthorized signal if the unauthorized signal is identified from the abnormal signals, and reports the characteristics of the abnormal signals to a centralized cloud server if no unauthorized signal is identified from the abnormal signals reported by the junior-testing processing terminal and the professional-testing processing terminal.

Block 204: The centralized cloud server identifies the characteristics of the abnormal signals reported by the authorized base station/AP and notifies the authorized base station/AP of processing the unauthorized signal if the unauthorized signal is identified from the abnormal signals reported by the authorized base station/AP.

According to various embodiments of the present disclosure, the method further includes that the centralized cloud server stores the characteristics of the identified signal in a local signal characteristic database. The centralized cloud server and the authorized base station/AP exchange the characteristics of the identified signal via the feedback link and update the local signal characteristic database according to the characteristics of the identified signal. The authorized base station/AP and the professional-testing processing terminal exchange the characteristics of the identified signal via the feedback link and update the local signal characteristic database according to the characteristics of the identified signal.

According to various embodiments of the present disclosure, the method may omit block 201. At block 203, the authorized base station/AP identifies the characteristics of the abnormal signals reported by the professional-testing processing terminal.

The above blocks are respectively described in detail hereinafter.

At the above block 201 and block 202, the junior-testing processing terminal and professional-testing processing terminal detect abnormal signals in their detection scope by sampling Radio Frequency (RF) signals received by the junior-testing processing terminal and professional-testing processing terminal and determining whether the RF signals include an abnormal signal via computing a relationship between sampling information and a preset threshold, extracting the characteristics of the abnormal signal and the characteristics of the frequency used by the abnormal signal if the RF signals include the abnormal signal, and reducing dimensionality of the characteristic of the abnormal signal.

Figure 3:
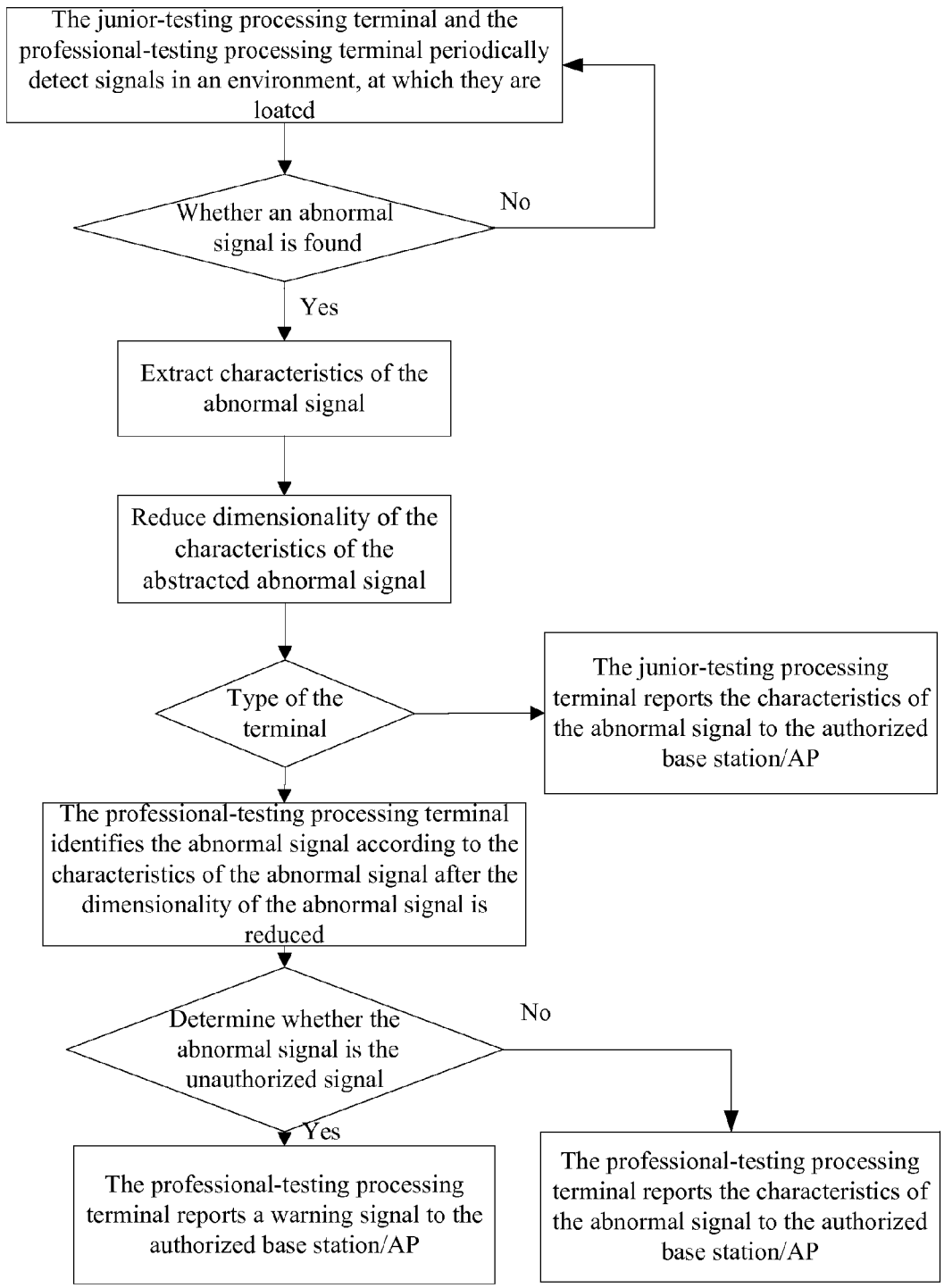
FIG. 3 is a flow chart illustrating the processing of a junior-testing processing terminal and a professional-testing processing terminal according to various embodiments.

FIG. 3 is a flow chart illustrating the processing of a junior-testing processing terminal and a professional-testing processing terminal according to various embodiments of the present disclosure. The above block 201 and block 202 are described hereinafter in detail accompanying with FIG. 3.

Block 201 includes the following (11) to (14).

(11): The junior-testing processing terminal periodically detects signals in the environment, at which the junior-testing processing terminal is located, and determines whether the signals include an abnormal signal. The junior-testing processing terminal detects a section of received RF signals in real time with an improved signal energy detection method. The signal energy detection method includes sampling the received RF signals and calculating modulus value of each sampling point to obtain a sampling signal amplitude set, calculating energy statistics and improvement statistics, such as difference statistics and variance statistics of each section of RF signals according to the sampling signal amplitude set, and determining whether the received RF signals include the abnormal signal according to a relationship between the energy statistics and a threshold of the energy statistics and a relationship between the improvement statistics and a threshold of the improvement statistics. (12) is performed if the received RF signals include the abnormal signal. Nothing is done if the received RF signals do not include the abnormal signal.

(12): After the junior-testing processing terminal detects the abnormal signal, the junior-testing processing terminal extracts the characteristics of the abnormal signal and the characteristics of the frequency used by the abnormal signal. The characteristics of the abnormal signal include statistical characteristics of instantaneous amplitude of the abnormal signal, instantaneous phase and instantaneous frequency of the abnormal signal, high-order statistics, cyclostationary characteristics, and wavelet domain characteristics of the abnormal signal. Time-domain sampling is performed for the abnormal signal to obtain a time-domain sampling set. If a modulus operation is performed for each sampling point in the sampling set, a time-domain amplitude feature vector is obtained. The statistical characteristics of the instantaneous amplitude are obtained via calculating a mean value and standard deviation, etc. of the amplitude feature vector. Alternatively, as for the time-domain sampling set, the instantaneous phase of the abnormal signal is extracted via an all-phase time-shift phase difference correction method and the statistical characteristics of the instantaneous phase is obtained by calculating the mean value and standard deviation, etc. of the instantaneous phase. Alternatively, the time-domain sampling set is transformed into the frequency-domain sampling set via a nonparametric Welch power spectral density estimation method and statistical characteristics, such as the frequency-domain amplitude, mean value of the frequency, and standard deviation are calculated and obtained. Fourier series decomposition may be performed for a cyclic autocorrelation function by calculating the cyclic autocorrelation function of the sampling set. Fourier transform may be performed for the coefficient of Fourier series, i.e. cyclic autocorrelation function to obtain cyclic spectrum density of the abnormal signal. The cyclic spectrum density is the cyclostationary characteristics of the abnormal signal. Further, wavelet transform may be performed for the time-domain sampling set to extract wavelet-domain characteristics, such as a singular point, zero crossing point, and extreme point of the abnormal signal.

(13): The junior-testing processing terminal reduces the dimensionality of the extracted abnormal signal. That is, the junior-testing processing terminal screens the original signal characteristic set, removes redundant features, and obtains a characteristic subset with better classification identification accuracy. The dimensionality of the original signal characteristic set may be reduced with a characteristic subset selection method, such a combination of successive forward selection, successive backward deletion, and successive forward selection and successive backward deletion. The method includes predefining a characteristic set value evaluation function, gradually screening the characteristics in the signal characteristic set from the original signal characteristic set according to a characteristic selection rule, such as a backward selection and depth-first search to obtain a signal characteristic subset, evaluating the signal characteristic subset according to the characteristic set value evaluation function, iteratively screening the signal characteristic subset if the value of the signal characteristic subset is larger than a threshold, and discarding the signal characteristic subset if the value of the signal characteristic subset is less than or equal to a threshold. After the whole screening process ends, the signal characteristic subset with the largest value is selected as the characteristics of the abnormal signal with the dimensionality reduced.

(14): The junior-testing processing terminal initiatively reports the characteristics of the abnormal signal and the characteristics of the frequency used by the abnormal signal to the authorized base station/AP via the feedback link between the junior-testing processing terminal and the authorized base station/AP.

The block 202 includes the following (21) to (26).

(21): The professional-testing processing terminal periodically performs signal detection in the environment, at which the professional-testing processing terminal locates and determines whether there is an abnormal signal. The professional-testing processing terminal detects a section of RF signals in real time with an improved signal energy detection method. The improved signal energy detection method includes sampling the received RF signals and calculating a modulus value of each sampling point to obtain a sampling signal amplitude set, calculating energy statistics and improvement statistics, such as difference statistics and variance statistics of each section of RF signals according to the sampling signal amplitude set, and determining whether the received RF signals include the abnormal signal according to a relationship between the energy statistics and a threshold of the energy statistics and a relationship between the improvement statistics and a threshold of the improvement statistics. (22) is performed if the received RF signals include the abnormal signal. Nothing is done if the received RF signals do not include the abnormal signal.

(22): After the professional-testing processing terminal detects the abnormal signal, the professional-testing processing terminal extracts the characteristics of the abnormal signal and the characteristics of the frequency used by the abnormal signal. The characteristics of the abnormal signal include statistical characteristics of instantaneous amplitude of the abnormal signal, instantaneous phase and instantaneous frequency of the abnormal signal, high-order statistics, cyclostationary characteristics, and wavelet domain characteristics of the abnormal signal. Time-domain sampling is performed for the abnormal signal to obtain a time-domain sampling set. If a modulus operation is performed for each sampling point in the sampling set, a time-domain amplitude feature vector is obtained. The statistical characteristics of the instantaneous amplitude are obtained via calculating a mean value and standard deviation, etc. of the amplitude feature vector. Alternatively, as for the time-domain sampling set, the instantaneous phase of the abnormal signal is extracted via an all-phase time-shift phase difference correction method and the statistical characteristics of the instantaneous phase is obtained by calculating the mean value and standard deviation, etc. of the instantaneous phase. Alternatively, the time-domain sampling set is transformed into the frequency-domain sampling set via a nonparametric Welch power spectral density estimation method and statistical characteristics, such as the frequency-domain amplitude, mean value of the frequency and standard deviation are calculated and obtained. Fourier series decomposition may be performed for a cyclic autocorrelation function by calculating the cyclic autocorrelation function of the sampling set. Fourier transform may be performed for the coefficient of Fourier series, i.e. cyclic autocorrelation function to obtain cyclic spectrum density of the abnormal signal. The cyclic spectrum density is the cyclostationary characteristics of the abnormal signal. Further, wavelet transform may be performed for the time-domain sampling set to extract wavelet-domain characteristics such as a singular point, zero crossing point, and extreme point of the abnormal signal.

(23): The professional-testing processing terminal reduces the dimensionality of the extracted abnormal signal. That is, the professional-testing processing terminal screens an original signal characteristic set, removes redundant features, and obtains a characteristic subset with better classification identification accuracy. The dimensionality of the original signal characteristic set may be reduced with a characteristic subset selection method, such a combination of successive forward selection, successive backward deletion, and successive forward selection and successive backward deletion. The method includes predefining a characteristic set value evaluation function, gradually screening the characteristics in the signal characteristic set from the original signal characteristic set according to a characteristic selection rule, such as a backward selection and depth-first search to obtain a signal characteristic subset, evaluating the signal characteristic subset according to the characteristic set value evaluation function, iteratively screening the signal characteristic subset if the value of the signal characteristic subset is larger than a threshold, and discarding the signal characteristic subset if the value of the signal characteristic subset is less than or equal to a threshold. After the whole screening process ends, the signal characteristic subset with the largest value is selected as the characteristics of the abnormal signal with the dimensionality are reduced.

(24): The professional-testing processing terminal identifies the abnormal signal to determine whether the abnormal signal is the unauthorized signal with a classification identification algorithm in machine learning according to the characteristics of the abnormal signal after the dimensionality is reduced.

A classification rule and a target function of the classification rule corresponding to the classification identification algorithm are determined according to the classification identification algorithm in machine learning, such as a decision tree, Support Vector Machine (SVM), and Naive Bayesian and Self Organizing Map (SOM). The target function corresponding to classification rule is trained and solved with the characteristic of all unauthorized signals and types of the unauthorized signals in the local unauthorized signal characteristic database, so that a complete classification decision is generated with optimized classification rule parameters of the target function corresponding to the classification rule. As for each abnormal signal that needs to be identified, the likelihood of the abnormal signal in each signal type is calculated according to the classification decision and the signal type of the abnormal signal with the maximum likelihood is determined. That is, if the signal type of the abnormal signal is the signal type of the abnormal signal with the maximum likelihood, the abnormal signal is determined as the unauthorized signal. If the abnormal signal is the unauthorized signal, (25) is performed. (26) is performed if the abnormal signal is not the unauthorized signal.

(25): The professional-testing processing terminal initiatively reports a warning signal to the authorized base station/AP via a feedback link between the professional-testing processing terminal and the authorized base station/AP and requires the authorized base station/AP to add the transmitting power to the frequency used by the unauthorized signal to shield the unauthorized signal of the pseudo base-station/unauthorized AP.

(26): The professional-testing processing terminal initiatively reports the characteristics of the abnormal signal and the characteristics of the frequency used by the abnormal signal to the authorized base station/AP via the feedback link between the junior-testing processing terminal and the authorized base station/AP.

Figure 4:
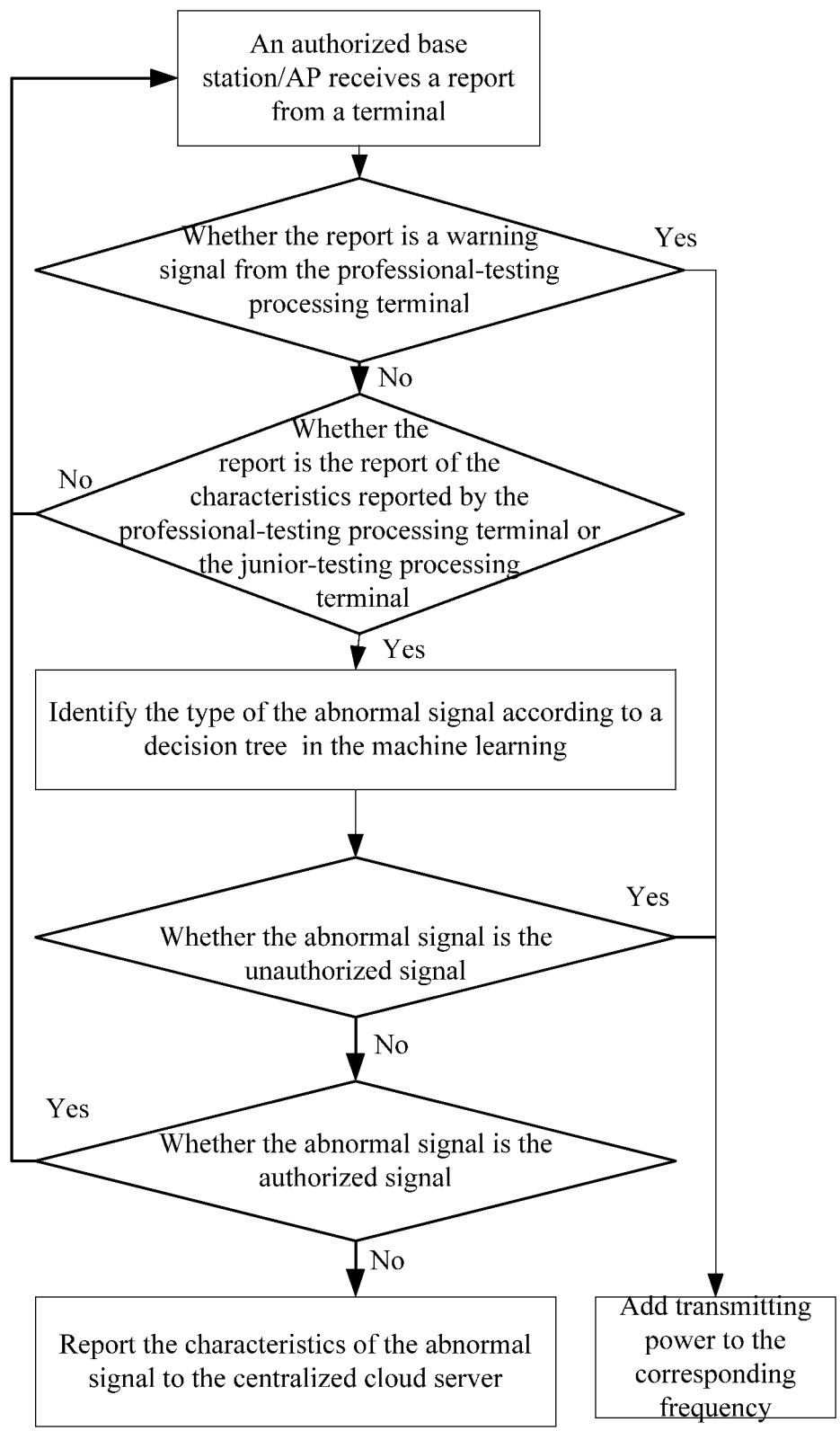
FIG. 4 is a flow chart illustrating the processing of an authorized base station/AP according to various embodiments.

FIG. 4 is a flow chart illustrating the processing of an authorized base station/an AP according to various embodiments of the present disclosure. The above block 203 is further described hereinafter with FIG. 4. Block 203 includes (31) to (37).

(31): The authorized base station/AP receives the characteristics of the abnormal signal and the characteristics of the frequency used by the abnormal signal reported by the junior-testing processing terminal identifies the abnormal signal with the classification identification algorithm in the machine learning, and determines the type of the abnormal signal.

A classification rule and a target function of the classification rule corresponding to the classification identification algorithm are determined according to the classification identification algorithm in machine learning, such as a decision tree, Support Vector Machine (SVM), Naive Bayesian, and Self Organizing Map (SOM). The target function corresponding to classification rule is trained and solved with the characteristic of all signals and types of the signals in the local signal characteristic database, so that a complete classification decision is generated with optimized classification rule parameters of the target function corresponding to the classification rule. As for each abnormal signal that needs to be identified, the likelihood of the abnormal signal of each signal type is calculated according to the classification decision and the signal type of the abnormal signal with the maximum likelihood is determined. The signal types include the authorized signal, unauthorized signal, and the abnormal signal, the type of which cannot be identified. If the abnormal signal is the unauthorized signal, nothing is done. If the abnormal signal is the unauthorized signal, (32) is performed. If the abnormal signal is the abnormal signal, the type of which cannot be determined, (33) is performed.

(32): The authorized base station/AP adds the transmitting power to the frequency used by the unauthorized signal to shield the unauthorized signal of the pseudo base-station/unauthorized AP.

(33): The authorized base station/AP reports the characteristics of the abnormal signal and the characteristics of the frequency used by the abnormal signal to the centralized cloud server via the feedback link between the authorized base station/AP and a cloud computing platform.

(34): The authorized base station/AP receives the alert signal reported by the professional-testing processing terminal and adds the transmitting power to the frequency used by the unauthorized signal to shield the unauthorized signal of the pseudo base-station/unauthorized AP.

(35): The authorized base station/AP receives the characteristics of the abnormal signal and the characteristics of the frequency used by the abnormal signal reported by the professional-testing processing terminal identifies the abnormal signal with the classification identification algorithm in the machine learning, and determines the type of the abnormal signal.

A classification rule and a target function of the classification rule corresponding to the classification identification algorithm are determined according to the classification identification algorithm in machine learning, such as a decision tree, Support Vector Machine (SVM), Naive Bayesian, and Self Organizing Map (SOM). The target function corresponding to the classification rule is trained and solved with the characteristic of all signals and signal types in the local signal characteristic database, so that a complete classification decision is generated with optimized classification rule parameters of the target function corresponding to the classification rule. As for each abnormal signal that needs to be identified, the likelihood of the abnormal signal of each signal type is calculated according to the classification decision and the signal type of the abnormal signal with the maximum likelihood is determined. The signal types include an authorized signal type, unauthorized signal type, and the abnormal signal type, in which it cannot be determined whether the abnormal signal is the authorized signal or unauthorized signal. If the abnormal signal is the unauthorized signal, nothing is done. If the abnormal signal is the unauthorized signal, (36) is performed. If the abnormal signal is the abnormal signal, the type of which cannot be determined, (37) is performed.

(36): The authorized base station/AP adds the transmitting power to the frequency used by the unauthorized signal to shield the unauthorized signal of the pseudo base-station/unauthorized AP.

(37): The authorized base station/AP reports the characteristics of the abnormal signal and the characteristics of the frequency used by the abnormal signal to the centralized cloud server via the feedback link between the authorized base station/AP and the cloud computing platform.

Figure 5:
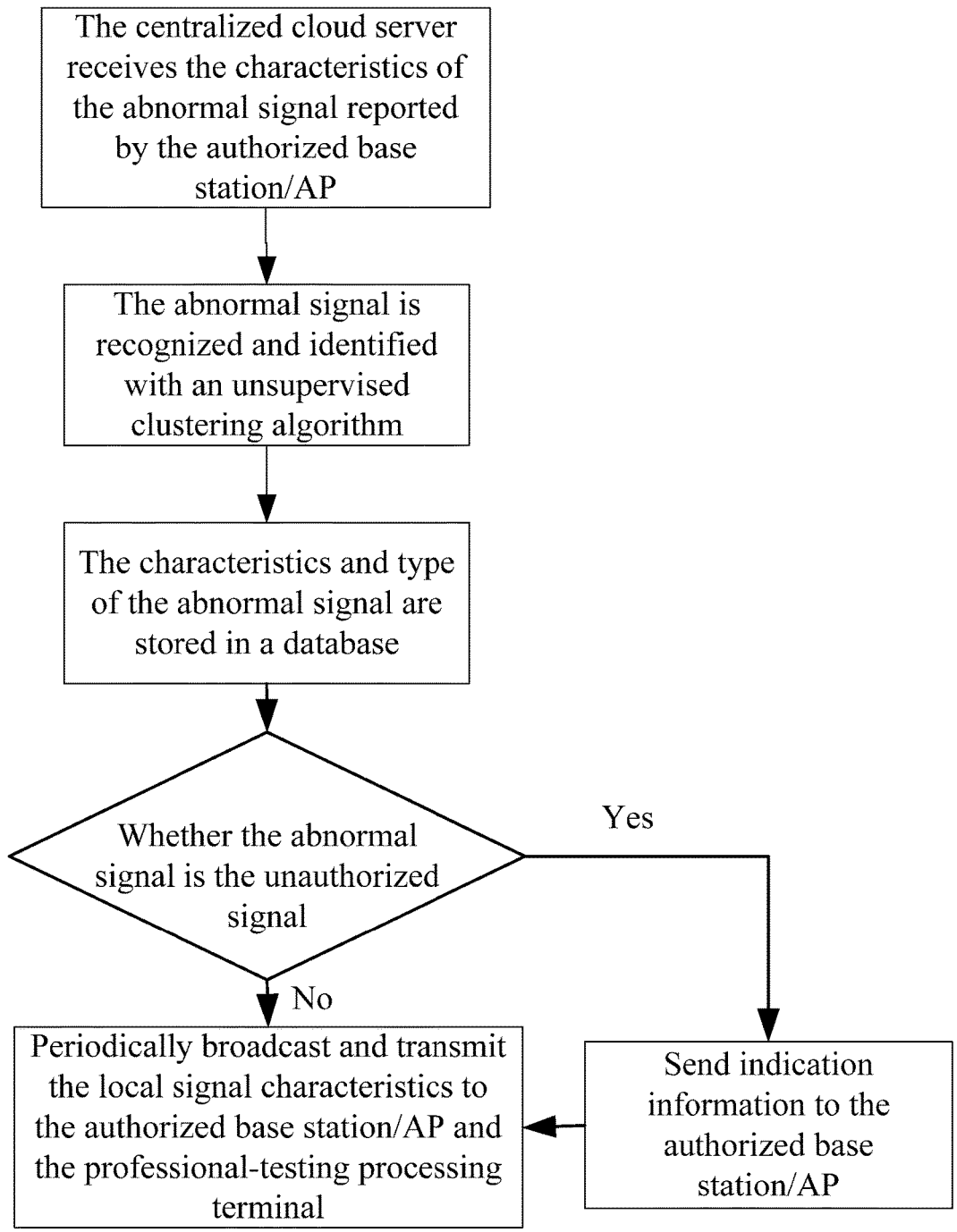
FIG. 5 is a flow chart illustrating operation processes performed by a centralized cloud server according to various embodiments.

FIG. 5 is a flow chart illustrating operation methods performed by a centralized cloud server according to various embodiments of the present disclosure. The above block 204 is described hereinafter with reference to FIG. 5. The centralized cloud server receives the characteristics of the abnormal signal and the characteristics of the frequency used by the normal signal, which cannot be identified by the authorized base station/AP, makes decisions on the received information, and identifies the type of the abnormal signal. If the abnormal signal is the unauthorized signal, the centralized cloud server requires the authorized base station/AP to add the transmitting power to the frequency used by the unauthorized signal to shield the unauthorized signal of the pseudo-base station/unauthorized AP.

Block 204 includes (41) to (43).

(41): The centralized cloud server receives the characteristics of the abnormal signal and the characteristics of the frequency used by the normal signal, which cannot be identified by the authorized base station/AP and recognizes and identifies the abnormal signal with a data mining method. As for characteristics of all signals and types of the signals in the centralized cloud server database, according to an unsupervised clustering algorithm, the characteristics of all signals corresponding to each signal type are taken as a cluster and the mean value or center of the cluster is calculated according to the characteristics of the signals in the cluster, the distance between the characteristics of the abnormal signal and the center of each cluster is calculated and the abnormal signal is given to the cluster, in which the distance between the characteristics of the abnormal signal and the center of the cluster is the minimum one. The signal type corresponding to the cluster is the type of the abnormal signal. The signal types include the authorized signal type and the unauthorized signal type.

(42): If the abnormal signal is the unauthorized signal, the centralized cloud server sends indication information to the authorized base station/AP via the feedback link between the cloud computing platform and the authorized base station/AP and requires the authorized base station/AP to add the transmitting power to the frequency used by the unauthorized signal to shield the unauthorized signal of the pseudo base-station/unauthorized AP.

(43): The centralized cloud server stores the characteristics and type of the abnormal signal, which is identified via the decision in the local signal characteristic database, receives the characteristics of the unauthorized signals reported by the professional-testing processing terminal and authorized base station/AP level-by-level, automatically updates the local signal characteristic database, and regularly broadcasts the characteristics of the signals and the signal types stored at local to the authorized base station/AP and the professional-testing processing terminal. The authorized base station/AP and professional-testing processing terminal automatically update the local signal characteristic database according to computing capabilities stored at local. This method includes following operation contents.

(431): The centralized cloud server stores the characteristics of the identified signal via decisions in the local signal characteristic database.

(432): The professional-testing processing sends the characteristics of the unauthorized signal, which are newly added at local, to the authorized base station/AP via the feedback link between the professional-testing processing terminal and authorized base station/AP. The authorized base station/AP automatically updates the local signal characteristic database according to the computing capability stored at local.

(433): The authorized base station/AP sends the characteristics of the signal, which are newly added at local, to the centralized cloud server via the feedback link between the authorized base station/AP and the centralized cloud server. The centralized cloud server automatically updates its local signal characteristic database.

(434): The centralized cloud server regularly sends the characteristics of the signal, which are newly added at local, to the authorized base station/AP via the feedback link between the centralized computing platform and the authorized base station/AP. After the authorized base station/AP receives the characteristics of the signal, the authorized base station/AP automatically updates the local signal characteristic database.

(435): The authorized base station/AP regularly sends the characteristics of the unauthorized signal, which are newly added at local, to the professional-testing processing terminal via the feedback link between the authorized base station/AP and the professional-testing processing terminal. The professional-testing processing terminal automatically updates the local signal characteristic database according to computing capability stored at local. According to various embodiments, the local signal characteristic database on the professional-testing processing terminal is the local unauthorized signal characteristic database.

Figure 6:
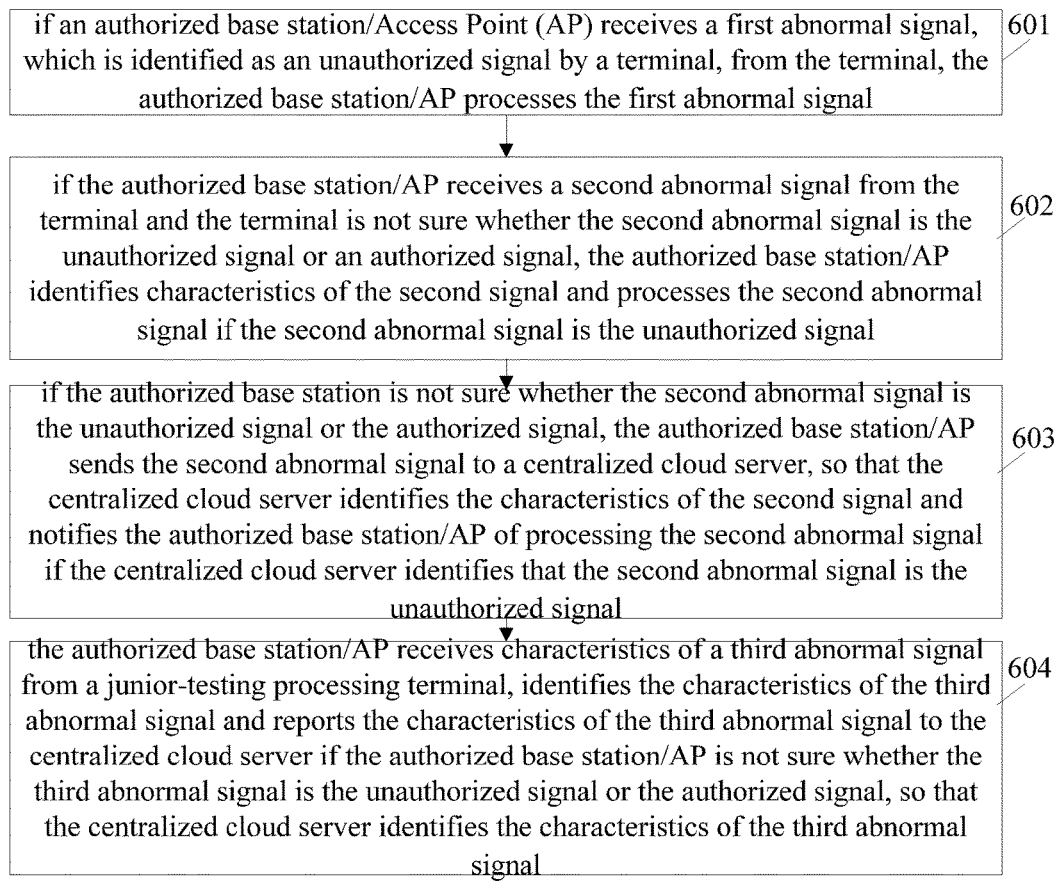
FIG. 6 is a flow chart illustrating another method for monitoring and processing wireless signals in real time according to various embodiments.

FIG. 6 is a flow chart illustrating another method for monitoring and processing wireless signals in real time according to various embodiments of the present disclosure. The method includes following blocks.

Block 601: If an authorized base station/Access Point (AP) receives a first abnormal signal, which is identified as an unauthorized signal by a terminal, from the terminal, the authorized base station/AP processes the first abnormal signal.

Block 602: If the authorized base station/AP receives a second abnormal signal from the terminal and the terminal is not sure whether the second abnormal signal is the unauthorized signal or an authorized signal, the authorized base station/AP identifies characteristics of the second signal and processes the second abnormal signal if the second abnormal signal is the unauthorized signal.

According to various embodiments of the present disclosure, the method further includes block 603.

Block 603: If the authorized base station is not sure whether the second abnormal signal is the unauthorized signal or the authorized signal, the authorized base station/AP sends the second abnormal signal to a centralized cloud server, so that the centralized cloud server identifies the characteristics of the second signal and notifies the authorized base station/AP of processing the second abnormal signal if the centralized cloud server identifies that the second abnormal signal is the unauthorized signal.

According to various embodiments of the present disclosure, the terminal is a professional-testing processing terminal. The method further includes block 604.

Block 604: The authorized base station/AP receives characteristics of a third abnormal signal from a junior-testing processing terminal, identifies the characteristics of the third abnormal signal, and reports the characteristics of the third abnormal signal to the centralized cloud server if the authorized base station/AP is not sure whether the third abnormal signal is the unauthorized signal or the authorized signal, so that the centralized cloud server identifies the characteristics of the third abnormal signal.

According to various embodiments of the present disclosure, at block 602, the authorized base station/AP identifies the characteristics of the second abnormal signal with a classification identification algorithm in machine learning to determine whether the second abnormal signal is the unauthorized signal.

According to various embodiments of the present disclosure, the authorized base station/AP identifies the characteristics of the second abnormal signal with the classification identification algorithm in the machine learning according to (35) in the above block 203.

Figure 7:
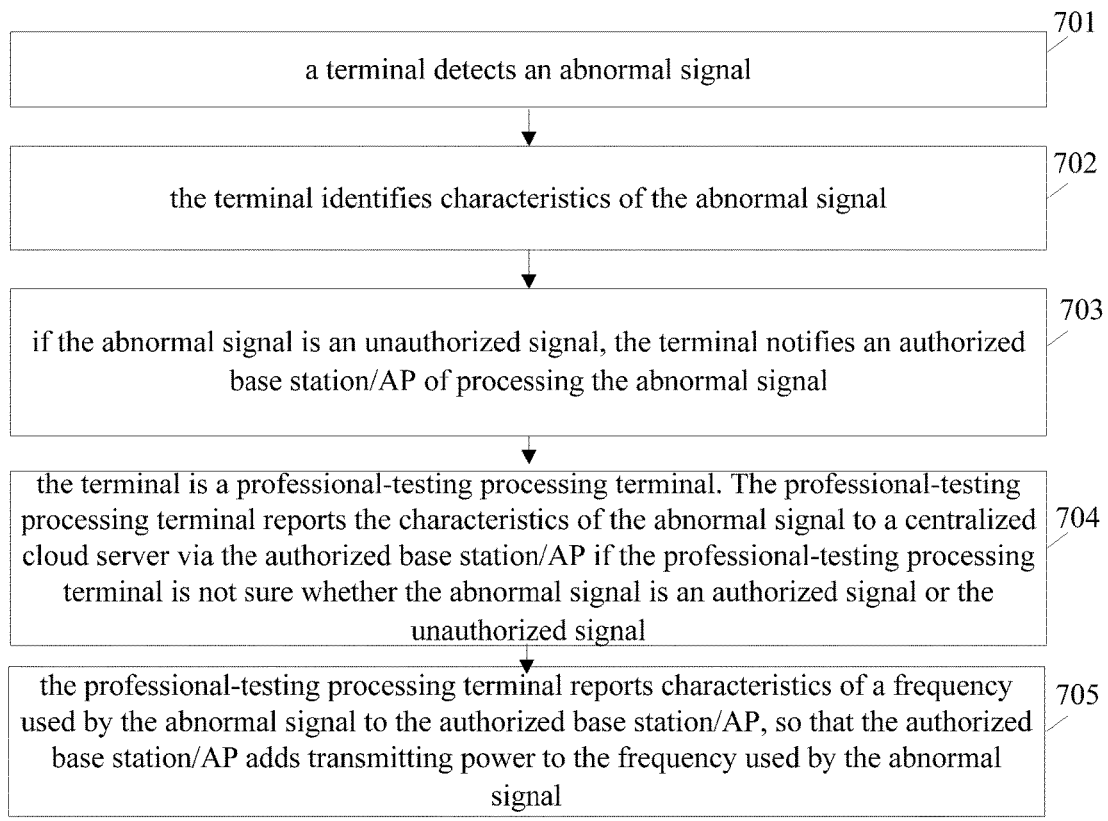
FIG. 7 is a flow chart illustrating another method for monitoring and processing wireless signals in real time according to various embodiments.

FIG. 7 is a flow chart illustrating another method for monitoring and processing wireless signals in real time according to various embodiments of the present disclosure. The method includes following blocks.

Block 701: A terminal detects an abnormal signal.

Block 702: The terminal identifies characteristics of the abnormal signal.

Block 703: If the abnormal signal is an unauthorized signal, the terminal notifies an authorized base station/AP of processing the abnormal signal.

According to various embodiments of the present disclosure, the terminal is a professional-testing processing terminal. The method further includes block 704. At block 704, the professional-testing processing terminal reports the characteristics of the abnormal signal to a centralized cloud server via the authorized base station/AP if the professional-testing processing terminal is not sure whether the abnormal signal is an authorized signal or the unauthorized signal.

According to various embodiments of the present disclosure, at block 702, the professional-testing processing terminal identifies the characteristics of the abnormal signal with a classification identification algorithm in machine learning to determine whether the abnormal signal is the unauthorized signal.

According to various embodiments of the present disclosure, the professional-testing processing terminal identifies the characteristics of the abnormal signal with the classification identification algorithm in the machine learning according to the above (24) at block 202.

According to various embodiments of the present disclosure, the method further includes block 705. At block 705, the professional-testing processing terminal reports characteristics of a frequency used by the abnormal signal to the authorized base station/AP, so that the authorized base station/AP adds transmitting power to the frequency used by the abnormal signal.

Figure 8:
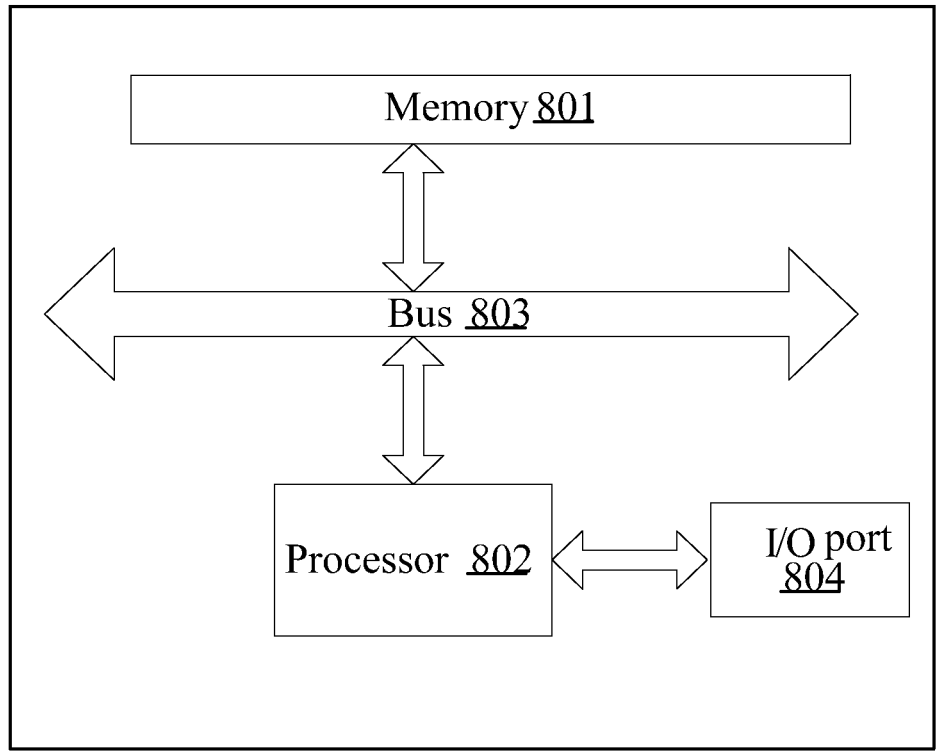
FIG. 8 is a diagram illustrating the structure of an authorized base station/AP for monitoring and processing wireless signals in real time according to various embodiments.

FIG. 8 is a diagram illustrating the structure of an authorized base station/AP for monitoring and processing wireless signals in real time according to various embodiments of the present disclosure. The authorized base station/AP includes a memory 801, a processor 802, a bus 803, and an I/O port 804. The memory 801 connects with the processor 802 and the bus 803. The processor 802 communicates with an external device via the I/O port 804. The memory 801 stores instructions executed by the processor 802 to perform the above blocks 601 and 602. The memory 801 further stores other instructions executed by the processor 802 to perform the above blocks 603 and 604.

Figure 9:
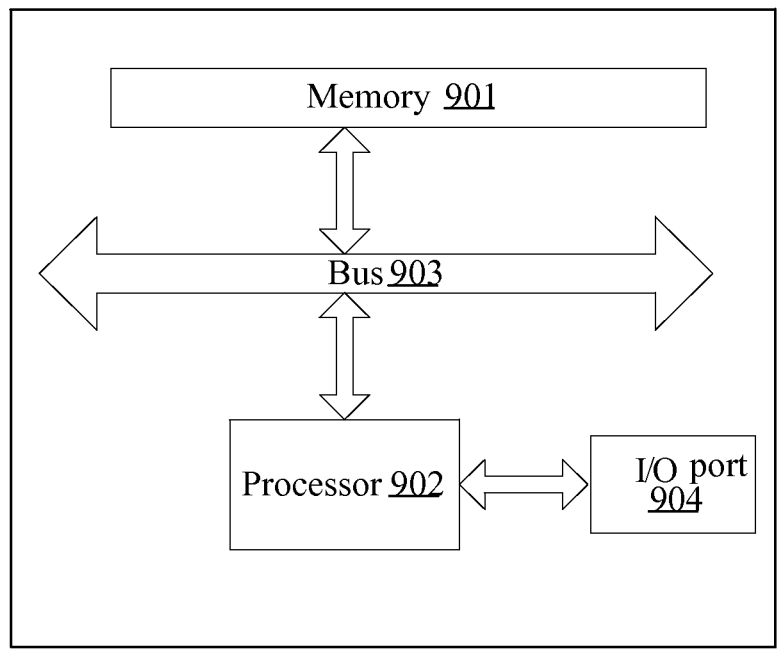
FIG. 9 is a diagram illustrating the structure of a terminal for monitoring and processing wireless signals in real time according to various embodiments.

FIG. 9 is a diagram illustrating the structure of a terminal for monitoring and processing wireless signals in real time according to various embodiments of the present disclosure. The terminal includes a memory 901, a processor 902, a bus 903, and an I/O port 904. The memory 901 connects with the processor 902 and the bus 903. The processor 902 communicates with an external device via the I/O port 904. The memory 901 stores instructions executed by the processor 902 to perform the above blocks 701 to 703. The memory 901 further stores other instructions executed by the processor 902 to perform the above blocks 704 and 705.

Various embodiments of the present disclosure improve the conventional totally-centralized cloud computing system. The computing and processing capability of the wireless terminal and wireless base station/AP is improved and an improved cloud computing platform is the result. In the improved cloud computing platform, the wireless terminal indirectly accesses the cloud computing resources via the authorized base station/AP, so that the wireless terminal does not need to rely on the capability of its hard disk and software and adequately utilizes the strong computing and processing capability and huge amount data storage function of the cloud platform. Therefore, various challenges associated with the conventional totally-centralized computing platform may be solved. The complicated wireless signals may be supervised and managed in real time in the current environment via orderly operations.

The processing system according to various embodiments of the present disclosure is an edge cloud computing platform suitable for monitoring and analyzing the wireless signal in real time and making decisions. The edge cloud computing platform may improve the computing and communication processing capability of the terminal, base station/AP, and centralized cloud server in the current environment, solve the drawbacks of deficiency of the communication capability of the conventional centralized architecture, implement functions, such as real-time detection, characteristic extraction, dimensionality reduction, signal identification, characteristic storage of the wireless signal, and effectively identify and shield the unauthorized signal of the pseudo base-station/unauthorized AP.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Further, each function module according to various embodiments of the present disclosure may be integrated in one processing unit or separately set on each module. Alternatively, two or more than two modules may be integrated in one unit. The above integrated units may be implemented in the form of the hard disks or software function units. The function modules of the various embodiments may be located at one terminal or network node, or distributed in multiple terminals or network nodes.

Further, the various embodiments of the present disclosure may be implemented via data processing device, such as data processing programs executed by the computer. In this situation, the data processing programs constitute the present disclosure. Further, generally, the data processing program stored in one storage medium may be executed by reading the data processing program from the storage medium, or installed or copied to the storage device (such as the hard disk or memory) of the data processing device. Therefore, the storage medium also constitutes the present disclosure. The storage medium may use any type of recording mode, such as paper storage medium (such as paper tape, etc.), magnetic storage medium (such as floppy, hard disk, flash memory, etc.), optical storage medium (such as CD-ROM, etc.), magneto-optical storage medium (Magnetic-Optical), etc.

Therefore, various embodiments of the present disclosure further provide a storage medium, which stores the data processing program. The data processing program executes any of the above various embodiments in the present disclosure.

Further, in addition to the data processing program, the method processes in the present disclosure may be implemented via the hard disk, such as a logic gate, switch, Application Specific Integrated Circuit (ASIC), programmable logic controller and embedded microcontroller, etc. Therefore, the hard disk used for implementing the methods of the present disclosure may constitute the present disclosure.

The foregoing descriptions are merely preferred embodiments of the present disclosure, but are not intended to limit the protection scope of the present disclosure. Any modification, equivalent replacement, or improvement made within the spirit and principle of the present disclosure shall fall within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for monitoring and processing a wireless signal, comprising:
   detecting, by a terminal, a first abnormal signal, identifying, by the terminal, characteristics of the first abnormal signal, determining whether the first abnormal signal is an unauthorized signal, notifying, when the first abnormal signal is the unauthorized signal, an authorized base station/l Access Point (AP) of processing the first abnormal signal and reporting, when the terminal is not sure whether the first abnormal signal is the unauthorized signal or an authorized signal, the characteristics of the first abnormal signal to the authorized base station/AP;
   identifying, by the authorized base station/AP, the characteristics of the first abnormal signal reported by the terminal when the terminal cannot determine whether the first abnormal signal is the unauthorized signal or the authorized signal, processing, by the authorized base station/AP, the first abnormal signal when the first abnormal signal is the unauthorized signal and reporting the characteristics of the first abnormal signal to a centralized cloud server when the authorized base station/AP cannot determine whether the first abnormal signal is the unauthorized signal or authorized signal;
   identifying, by the centralized cloud server, the characteristics of the first abnormal signal when the terminal and the authorized base station/AP cannot determine whether the first abnormal signal is the unauthorized signal or authorized signal and notifying the authorized base station/AP of processing the first abnormal signal when the first abnormal signal is the unauthorized signal;
   wherein notifying, when the first abnormal signal is the unauthorized signal, the authorized base station/Access Point (AP) of processing the first abnormal signal comprises: reporting, when the first abnormal signal is the unauthorized signal, a warning signal to the authorized base station/Access Point (AP) instructing the authorized base station/Access Point (AP) to process the first abnormal signal.

2. The method according to claim 1, wherein the terminal is a professional-testing processing terminal, the method further comprises:
   detecting, by a junior-testing processing terminal, a second abnormal signal and reporting characteristics of the second abnormal signal to the authorized base station/AP;
   identifying, by the authorized base station/AP, the characteristics of the second abnormal signal, processing, when the second abnormal signal is the unauthorized signal, the second abnormal signal and reporting the characteristics of the second abnormal signal to the centralized cloud server when the authorized base station/AP cannot determine whether the second abnormal signal is the unauthorized signal or the authorized signal; and
   identifying, by the centralized cloud server, the characteristics of the second abnormal signal when the authorized base station/AP cannot determine whether the second abnormal signal is the unauthorized signal or the authorized signal and notifying the authorized base station/AP of processing the second abnormal signal when the second abnormal signal is the unauthorized signal.

3. The method according to claim 2, further comprising:
storing, by the centralized cloud server, characteristics of an identified abnormal signal in a local signal characteristic database on the centralized cloud server;
exchanging, by the centralized cloud server and the authorized base station/AP, the characteristics of the identified abnormal signal via a feedback link between the centralized cloud server and the authorized base station/AP; and
exchanging, by the authorized base station/AP and the professional-testing processing terminal, the characteristics of the identified abnormal signal via a feedback link between the authorized base station/AP and the professional-testing processing terminal.

4. The method according to claim 2, wherein
identifying, by the professional-testing processing terminal, the characteristics of the first abnormal signal includes identifying the characteristics of the first abnormal signal with a classification identification algorithm in machine learning to determine whether the first abnormal signal is the unauthorized signal;
identifying, by the authorized base station/AP, the characteristics of the first abnormal signal includes identifying the characteristics of the first abnormal signal with the classification identification algorithm in the machine learning to determine whether the first abnormal signal is the unauthorized signal; and
identifying, by the centralized cloud server, the characteristics of the first abnormal signal includes identifying, by the centralized cloud server, the characteristics of the first abnormal signal with a data mining method to determine whether the first abnormal signal is the unauthorized signal.

5. The method according to claim 4, wherein identifying, by the centralized cloud server, the characteristics of the first abnormal signal with the data mining method to determine whether the first abnormal signal is the unauthorized signal comprises:
as for characteristics of all signals and signal types in the centralized cloud server, according to an unsupervised clustering algorithm, taking characteristics of all signals of each signal type as a cluster, calculating a mean value or center of each cluster according to characteristics of signals in the each cluster, calculating a distance between the characteristics of the first abnormal signal and the center of each cluster, giving the first abnormal signal to a cluster, in which the distance between the characteristics of the first abnormal signal and the center of the cluster is the minimum one;
a signal type corresponding to the cluster is the type of the first abnormal signal and the signal type is: an authorized signal or the unauthorized signal.

6. The method according to claim 2, further comprising:
reporting, by the professional-testing processing terminal, characteristics of a frequency used by the first abnormal signal to the authorized base station/AP;
reporting, by the junior-testing processing terminal, characteristics of a frequency used by the second abnormal signal to the authorized base station/AP;
wherein processing, by the authorized base station/AP, the first abnormal signal comprises: increasing transmitting power of a first signal transmitted using the frequency used by the first abnormal signal; and processing, by the authorized base station/AP, the second abnormal signal comprises: increasing transmitting power of a second signal transmitted using the frequency used by the second abnormal signal.

7. A system for monitoring and processing a wireless signal, comprising:
a terminal, to detect a first abnormal signal, identify characteristics of the first abnormal signal, determine whether the first abnormal signal is an unauthorized signal, notify, when the first abnormal signal is the unauthorized signal, an authorized base station/Access Point (AP) of processing the first abnormal signal and report, when the terminal cannot determine whether the first abnormal signal is the unauthorized signal or an authorized signal, the characteristics of the first abnormal signal to the authorized base station/AP;
the authorized base station/AP, to identify the characteristics of the first abnormal signal reported by the terminal when the terminal cannot determine whether the first abnormal signal is the unauthorized signal or the authorized signal, process the first abnormal signal when the first abnormal signal is the unauthorized signal and report the characteristics of the first abnormal signal to a centralized cloud server when the authorized base station/AP cannot determine whether the first abnormal signal is the unauthorized signal or the authorized signal; and
the centralized cloud server, to identify the first abnormal signal when the authorized base station/AP cannot determine whether the second abnormal signal is the unauthorized signal or the authorized signal and notify the authorized base station/AP of processing the first abnormal signal when the first abnormal signal is the unauthorized signal; wherein
the terminal, is further to report, when the first abnormal signal is the unauthorized signal, a warning signal to the authorized base station/Access Point (AP) instructing the authorized base station/Access Point (AP) to process the first abnormal signal.

8. The system according to claim 7, wherein the terminal is a professional-testing processing terminal, the system further comprises:
a junior-testing processing terminal, to detect a second abnormal signal and report the second abnormal signal to the authorized base station/AP;
the authorized base station/AP identifies characteristics of the second abnormal signal, processes, when the second abnormal signal is the unauthorized signal, the second abnormal signal and reports the characteristics of the second abnormal signal to the centralized cloud server when the authorized base station/AP cannot determine whether the second abnormal signal is the unauthorized signal or authorized signal; and
the centralized cloud server further identifies the characteristics of the second abnormal signal when the authorized base station/AP cannot determine whether the second abnormal signal is the unauthorized signal or the authorized signal and notifies the authorized base station/AP of processing the second abnormal signal when the second abnormal signal is the unauthorized signal.

9. The system according to claim 8, wherein
the professional-testing processing terminal further identifies the characteristics of the first abnormal signal with a classification identification algorithm in machine learning to determine whether the first abnormal signal is the unauthorized signal;

the authorized base station/AP further identifies the characteristics of the second abnormal signal which comprises identifying the characteristics of the first abnormal signal with the classification identification algorithm in the machine learning to determine whether the first abnormal signal is the unauthorized signal; and
the centralized cloud server further identifies the characteristics of the first abnormal signal with a data mining method to determine whether the first abnormal signal is the unauthorized signal.

10. The system according to claim 9, wherein the centralized cloud server further, as for characteristics of all signals and signal types in the centralized cloud server, according to an unsupervised clustering algorithm, takes characteristics of all signals of each signal type as a cluster, calculates a mean value or center of each cluster according to characteristics of signals in the each cluster, calculates a distance between the characteristics of the first abnormal signal and the center of each cluster and gives the first abnormal signal to a cluster, in which the distance between the characteristics of the first abnormal signal and the center of the cluster is the minimum one;
a signal type corresponding to the cluster is the type of the first abnormal signal and the signal type is: an authorized signal or the unauthorized signal.

11. A method for monitoring and processing a wireless signal, comprising:
when an authorized base station/Access Point (AP) receives a first abnormal signal, which is identified as an unauthorized signal by a terminal, from the terminal, receiving a warning signal from the terminal, processing, by the authorized base station/AP, the first abnormal signal according to the warning signal;
when the authorized base station/AP receives a second abnormal signal from the terminal and the terminal cannot determine whether the second abnormal signal is the unauthorized signal or an authorized signal, identifying, by the authorized base station/AP, characteristics of the second signal and processing the second abnormal signal when the second abnormal signal is the unauthorized signal;
when the authorized base station is not sure whether the second abnormal signal is the unauthorized signal or the authorized signal, sending, by the authorized base station/AP, the second abnormal signal to a centralized cloud server, so that the centralized cloud server identifies the characteristics of the second abnormal signal and notifies the authorized base station/AP of processing the second abnormal signal when the centralized cloud server identifies that the second abnormal signal is the unauthorized signal.

12. The method according to claim 11, wherein the terminal is a professional-testing processing terminal and the method further comprises:
receiving, by the authorized base station/AP, characteristics of a third abnormal signal from a junior-testing processing terminal, identifying the characteristics of the third abnormal signal and reporting the characteristics of the third abnormal signal to the centralized cloud server when the authorized base station/AP cannot determine whether the third abnormal signal is the unauthorized signal or the authorized signal, so that the centralized cloud server identifies the characteristics of the third abnormal signal.

13. The method according to claim 12, wherein
identifying, by the authorized base station/AP, the characteristics of the second abnormal signal reported by the professional-testing processing terminal comprises:
identifying the characteristics of the second abnormal signal with a classification identification algorithm in machine learning to determine whether the second abnormal signal is the unauthorized signal.

14. The method according to claim 13, wherein identifying, by the authorized base station/AP, the characteristics of the second abnormal signal with the classification identification algorithm in the machine learning comprises:
determining, by the authorized base station/AP, a classification rule and a target function of the classification rule according to the classification identification algorithm in machine learning, training and solving the target function corresponding to the classification rule according to characteristic of all signals and all signal types in a local signal characteristic database on the authorized base station/AP to obtain optimized classification rule parameters of the target function corresponding to the classification rule and generate a complete classification decision with the optimized classification rule parameters, calculating likelihood of the second abnormal signal of each signal type according to the classification decision and determining a signal type of the second abnormal signal with the maximum likelihood;
the signal types comprise: an authorized signal type, unauthorized signal type and an abnormal signal type, in which it cannot be determined whether the abnormal signal is the authorized signal or unauthorized signal;
the method further comprises: doing nothing when the second abnormal signal is the authorized signal; processing the second abnormal signal when the second abnormal signal is the unauthorized signal and reporting the characteristics of the second abnormal signal to the centralized cloud server when the authorized base station/AP cannot determine whether the second abnormal signal is the authorized signal or unauthorized signal.

* * * * *